May 1, 1934.  G. R. WOOD  1,957,190
SCRAPER
Filed Feb. 19, 1931
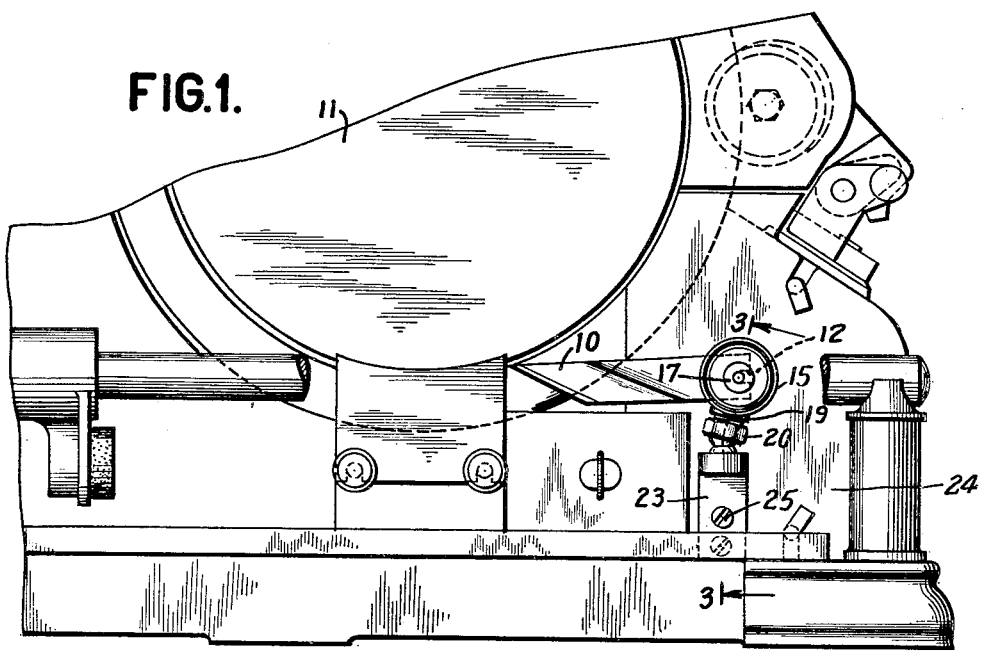
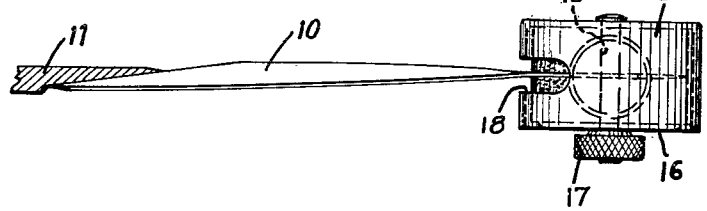
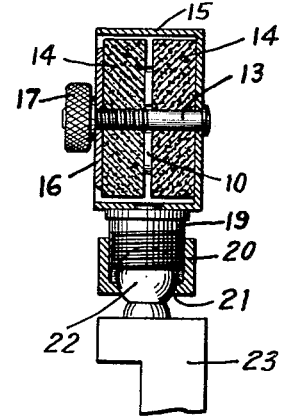
INVENTOR
Geo. R. Wood
BY ATTORNEY Patented May 1, 1934

1,957,190

UNITED STATES PATENT OFFICE 1,957,190

SCRAPER

George R. Wood, Toronto, Ontario, Canada, assignor, by mesne assignments, to International Business Machines Corporation, New York, N. Y., a corporation of New York Application February 19, 1931, Serial No. 516,978

7 Claims. (Cl. 146—102)

This case relates to slicing machines and particularly to the scraping mechanism thereof for removing particles of food or the like adhering to the rotary knife during a cutting operation.

The object of the invention is to provide a simple and novel scraper construction which will flex during its operation in accordance with the movement of the knife out of a true plane of motion.

Furthermore, the object of the invention is to provide a scraper which while flexible in operation will yet be durable and rugged in construction.

Various other objects and advantages of my invention will be obvious from the following particular description of one form of mechanism embodying the invention or from an inspection of the accompanying drawing; and the invention also constitutes certain new and novel features of construction and combination of parts hereinafter set forth and claimed.

In the drawing:

Fig. 1 is a view of one end of the slicing machine showing part of the rotary knife and scraper mechanism.

Fig. 2 is a top view of the scraper, and

Fig. 3 is a section on line 3—3 of Fig. 1.

In detail, the scraper comprises a blade 10 of steel or the like which while slightly flexible may be made more or less rigid. The forward edge of the scraper 10 is bevelled and adapted to engage the rim of the rotatable knife 11 to remove scraps of food adhering to its surface during a cutting operation. The rear end of the scraper blade 10 has an open slot 12 for receiving a threaded pin 13. A pair of resilient rubber disks 14 are freely seated on the pin 13 on opposite sides of the scraper blade. One end of the pin passes through a hole in the base of a cup-shaped shell 15. At this end the pin is headed to abut the outside of the base.

The cup-shaped shell serves to house, conceal, and support the rubber blocks 14, pin 13, and the rear end of the scraper blade 10. Opposite the base of the shell is a flat plate 16 freely carried on the threaded end of the pin 13 and engaging the side of the outer rubber block 14.

A knurled nut 17 is threaded on pin 13 outside the plate 16. By turning the nut in the proper direction, the plate 16 may be moved thereby towards the base of the shell 15 to tightly clamp the assembly of rubber blocks and scraper blade between the plate and the base of the shell. The rear end of the scraper blade is thus firmly clamped between the rubber blocks. The blade projects through a slot 18 in the periphery of the shell 15. By rotating the nut in the proper direction, the grip of the rubber blocks on the scraper blade may be released and the blade adjusted vertically of the slot.

The inherent compressibility of the blocks may be slightly altered by the adjustment of nut 17 to effect more or less tight clamping engagement of the blocks with the blade. Thus, the further in the nut is moved, the more the blocks themselves are inherently compressed and the less flexibility they possess. The periphery of the cup 15 has secured to its lower end an exteriorly threaded cup 19. Coacting with the threads on this cup 19 is a member 20 having a hole the edges of which are adapted to contact a ball 22 secured to a bracket 23 attached to slicer frame 24 by screws 25. The ball 22 provides a suitable universal seat for the member 20 and the shell 15 movable therewith. After adjustment of the shell 15 and member 20, the latter is rotated in a direction to lower the cup-shaped member 19 until the base thereof is firmly engaged with the top of the ball 22. The member 20 and cup 19 now clamp the ball 22 between them and further movement of the scraper carrier is thereby prevented.

It is well known that the rim of a knife such as 11 does not rotate in exactly a true plane but has a slight wobbling motion. Due to this motion, the scraper blade is vibrated in a direction transverse to the plane of the knife. If blade 10 were rigidly inflexibly mounted the vibration thereof would result in a great deal of friction which not only would cause rapid wear of the knife and scraper but would produce an accompanying high pitched, annoying, singing noise. By clamping the rear end of the blade 10 between resilient rubber disks 14, the blade may vibrate limited by the resiliency of the rubber disks but sufficiently freely to follow the wobble of the knife without opposing undue resistance thereto. In effect, the scraper is held in a flexible mounting whereby movement of the scraper transverse to the plane of the knife may occur without causing undue friction or annoying noises. Furthermore, the flexible mounting thereof is such that the scraper blade itself need not be flexible as sufficient flexibility is provided by the blocks 14 which serve at the same time to efficiently clamp the blade 10. Not only do the blocks 14 provide a flexible mounting for the blade 10 which permits it to vibrate transversely of the knife but they also provide means for flexibly permitting movement of the blade 10 in a vertical direction or in an oblique direction. It may be said therefore that the mounting for the scraper blade is universally flexible.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims:

1. In a slicing machine or the like, a cleaner for a rotating knife comprising a blade for engaging the knife to clean it during its rotation, a pair of universally yieldable resilient disks, one at each side of the blade to clamp the blade therebetween, a pin on which the blade and disks are mounted, a support for the pin including means for engaging the outer sides of the disks to hold them substantially fixed while the inner, adjacent, sides in contact with the cleaning blade yield universally with vibration of the blade in accordance with irregularities in the rotational plane of the knife, and means for securing the support to a stationary part of the slicer.

2. In a slicing machine or the like, a cleaner for a knife comprising a blade for engaging the knife, resilient means engageable with part of the blade for urging the blade towards the knife, a common housing for enclosing said part of the blade and said resilient means, and means for securing said housing to a stationary part of the machine.

3. In a slicing machine, a cleaner for a knife, comprising a cleaning member for engaging the knife, a hollow holder for receiving the rear end of the member, securing means including resilient clamping elements inside the holder for securing the rear end of the member to the holder, and a universally adjustable connection from the holder to a stationary part of the machine, said entire connection being disposed completely to one side of the holder and between the holder and the stationary part of the machine.

4. In a slicing machine, a cleaner for a knife, comprising a block fixed to a stationary part of the machine, a cleaning member for engaging the knife, a hollow holder for the member receiving the rear end of the member, securing means including resilient clamping washers inside the holder and at opposite sides of the rear end of the member for securing the rear end of the member to the holder, the member extending to one side of the holder and the block extending to another side of said holder, and a pivotal connection between the holder and block.

5. In a slicer, a cleaner for a knife, comprising a stationary support, a cleaning element, a device for resiliently engaging the element adjacent one end thereof, and a hollow member for releasably receiving therein said device and secured to said stationary support, said member serving to carry, house, and protect the device from grease and the like thrown off the knife.

6. In a slicing machine or the like, a cleaner for a slicing knife comprising a blade having a portion for engaging and cleaning the knife and a rear portion extending rearwardly of the knife engaging portion, a hollow member into which said rear portion projects, a pair of resilient disks inside said member and confined thereby, one disk being at each side of the rear portion of the blade, adjustable means carried by the holder and passing through the disks for adjustably clamping the disks to the rear portion of the blade, said disks providing a universally adjustable, yieldable mounting for the scraper, and a support for the hollow member on the machine.

7. In a slicing machine or the like; a cleaner for a rotating slicing knife comprising a scraper blade for engaging the knife during rotation of the latter, a pair of universally yieldable flexible disks for clamping the scraper blade between them to thereby support the blade for universally yieldable movement under the action of the knife to conform to irregularities in the plane of rotation of the knife, adjustable clamping means for clamping the outer sides of the flexible disks between them, and means for securing said adjustable clamping means to a stationary part of the slicing machine.

GEORGE R. WOOD.